United States Patent
Takahashi et al.

[11] Patent Number: 5,873,755
[45] Date of Patent: Feb. 23, 1999

[54] COWLING FOR OUTBOARD MOTOR

[75] Inventors: Masanori Takahashi; Hitoshi Watanabe, both of Hamamatsu, Japan

[73] Assignee: Sanshin Kogyo Kabushiki Kaisha, Japan

[21] Appl. No.: 823,751

[22] Filed: Mar. 25, 1997

[30] Foreign Application Priority Data

Mar. 25, 1996 [JP] Japan .................................... 8-094907
Mar. 25, 1996 [JP] Japan .................................... 8-094908

[51] Int. Cl.⁶ ................................................ B63H 20/32
[52] U.S. Cl. .............................................. 440/77; 440/88
[58] Field of Search ................... 440/77, 88; 123/195 C, 123/195 P, 198 E

[56] References Cited

U.S. PATENT DOCUMENTS

| | | | |
|---|---|---|---|
| 4,522,602 | 6/1985 | Okazaki | 440/77 |
| 4,533,331 | 8/1985 | Bland | 440/77 |
| 4,721,485 | 1/1988 | Suzuki | 123/195 P |
| 4,978,321 | 12/1990 | Ferguson | 440/88 |
| 5,328,395 | 7/1994 | Oishi | 440/77 |
| 5,340,343 | 8/1994 | Kawamukai et al. | 440/77 |
| 5,445,547 | 8/1995 | Furukawa | 440/77 |
| 5,488,939 | 2/1996 | Nakai et al. | 123/572 |

FOREIGN PATENT DOCUMENTS

| | | | |
|---|---|---|---|
| 2-212295 | 8/1990 | Japan | 440/77 |
| 4-166496 | 6/1992 | Japan | 440/77 |
| 6-16187 | 1/1994 | Japan | 440/88 |

*Primary Examiner*—Sherman Basinger
*Attorney, Agent, or Firm*—Knobbe, Martens, Olson & Bear, LLP

[57] ABSTRACT

A cowling for an outboard motor of the type having a water propulsion device powered by an internal combustion engine positioned within an engine compartment defined by the cowling, is disclosed. The cowling has at least one intake vent positioned therein and includes an engine cover which defines an isolated intake air path from the vent across a top end of the engine to an engine air intake. The cover also defines a chamber in which a flywheel rotated by the crankshaft at the top end of the engine is positioned. The chamber has an inlet in communication with the engine compartment, and an outlet leading to an exhaust passage. The exhaust passage leads to an exhaust vent in the cowling.

16 Claims, 12 Drawing Sheets

COWLING FOR OUTBOARD MOTOR

FIELD OF THE INVENTION

The present invention relates to an outboard motor. More specifically, the present invention is a cowling for an outboard motor powered by an internal combustion engine.

BACKGROUND OF THE INVENTION

Outboard motors are often powered by internal combustion engines. The engine is typically positioned within an enclosed cowling. The engine is generally vertically arranged, so that a crankshaft thereof may extend downwardly in driving relation with a water propulsion device of the motor, such as a propeller. In order to balance the motor and because of space considerations, the engine is arranged with a crankcase of the engine facing in the direction of a watercraft to which the motor is mounted, and with the cylinder head and intake system positioned on an end of the engine facing away from the watercraft.

Air must be supplied to the engine through the cowling for combustion. An air vent is provided in the cowling. Due to the orientation of the engine, a surge tank of the engine's intake system is positioned on the end of the engine facing the watercraft.

In order to prevent the direct entry of water through the vent into the intake system, the vent must be positioned away from the intake system. Thus, the vent is typically positioned in the portion of the cowling above the cylinder head of the engine (i.e., above the end of the engine opposite the surge tank). Air is drawn through the vent along the top of the engine to its front end and into the intake system.

A problem arises in that air within the cowling is heated by the engine and rises upwardly and mixes with the incoming fresh air. The engine thus draws a mixture of fresh and heated engine air, resulting in poor engine performance.

A cowling arrangement for an outboard motor which permits the engine therein to draw fresh air and which prevents the entry of water into the intake system, is desired.

SUMMARY OF THE INVENTION

In accordance with the present invention, there is provided a cowling for an outboard motor powered by an internal combustion engine. The motor is preferably of the type in which the engine is positioned within an engine compartment defined by the cowling. The engine has a top end and a bottom end and a generally vertically oriented crankshaft extending in driving relationship with a water propulsion device of the motor.

The cowling includes means for isolating and routing fresh air from a point external to the motor through the engine compartment to an air intake of the engine. The cowling also preferably includes means for routing heated air within the engine compartment to a point external to the motor.

In the preferred embodiment, the cowling includes an integral engine cover which substantially covers the top end of the engine, including a flywheel and camshaft drive. The cover defines an enclosed intake passage leading from at least one air vent in the cowling and extending generally across the top end of the engine to an engine air inlet. The engine air inlet comprises a passage leading to a surge tank positioned along a front end of the engine.

The cover also defines a chamber in which the flywheel rotates. The chamber has an inlet leading to the engine compartment therebelow in which the engine is positioned. The chamber has an air outlet leading to an exhaust passage. The exhaust passage leads to at least one exhaust vent in the cowling through which heated air is exhausted. Preferably, the flywheel has one or more vanes positioned thereon for drawing heated air through the inlet from the engine compartment and expelling it through the outlet and through the passage to the vent.

Preferably, an intake vent is positioned in each side of the cowling. The intake vents lead to an intake chamber having a pair of upstanding ports. The ports have openings leading to the intake passage. In this manner, the possibility water entering the intake passage through the vents is reduced. A water drain may also be positioned along the intake passage for draining any water which does pass through the ports into the passage.

Preferably, a single exhaust vent is positioned in an end of the cowling. The exhaust passage leads to an upwardly rising port in an exhaust chamber, with the vent positioned in a side of the chamber. This orientation serves to limit the entry of water through the exhaust vent and back into the engine compartment through the exhaust passage. A water drain may be positioned within the exhaust passage as well.

The cowling of the present invention serves to allow fresh air to be drawn through the cowling and directed to the engine without mixing with air which is heated by the engine within the engine compartment. At the same time, however, the intake system is arranged to prevent the entry of water into the engine.

Further, the cowling is arranged so that heated air within the engine compartment is drawn therefrom and exhausted from the cowling. In this manner, the temperature within the engine compartment remains cooler, minimizing the heating of the air passing through the cowling into the intake of the engine.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

In accordance with the present invention, there is provided an outboard motor 20 having a cowling in accordance with the present invention.

Figure 1:
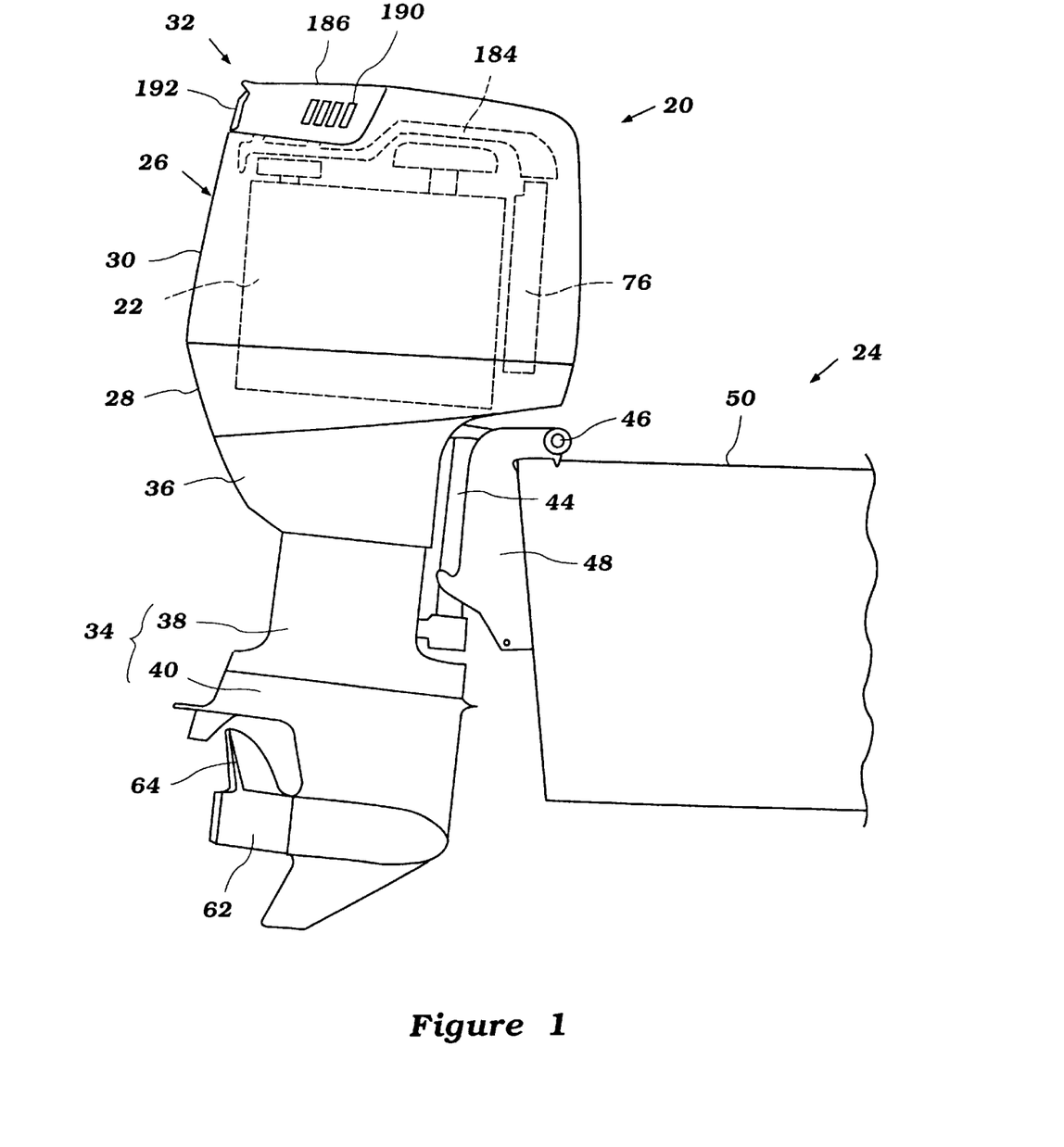
FIG. 1 is a side view of an outboard motor having a cowling in accordance with the present invention, the motor connected to a watercraft and powered by an internal combustion engine, illustrated in phantom.

As best illustrated in FIG. 1, the outboard motor 20 is utilized to power a watercraft 24. The outboard motor 20 has a powerhead area 26 comprised of a lower tray portion 28 and a main cowling portion 30. An air inlet or vent area 32 is provided in the main cowling portion 30 for providing air to an engine 22 therein, and for exhausting heated air from within the cowling 30, as described in more detail below. The motor 20 includes a lower unit 34 extending downwardly therefrom, with an apron 36 providing a transition between the powerhead 26 and the lower unit 34. The lower unit 34 comprises an upper or "drive shaft housing" section 38 and a lower section 40.

A steering shaft, not shown, is affixed to the lower section 40 of the lower unit 34 by means of a bracket 42. The steering shaft is supported for steering movement about a vertically extending axis within a swivel bracket 44. The swivel bracket 44 is connected by means of a pivot pin 46 to a clamping bracket 48 which is attached to a transom portion of a hull 50 of the watercraft. The pivot pin 46 permits the outboard motor 20 to be trimmed and tilted up about the horizontally disposed axis formed by the pivot pin 46.

Figure 2:
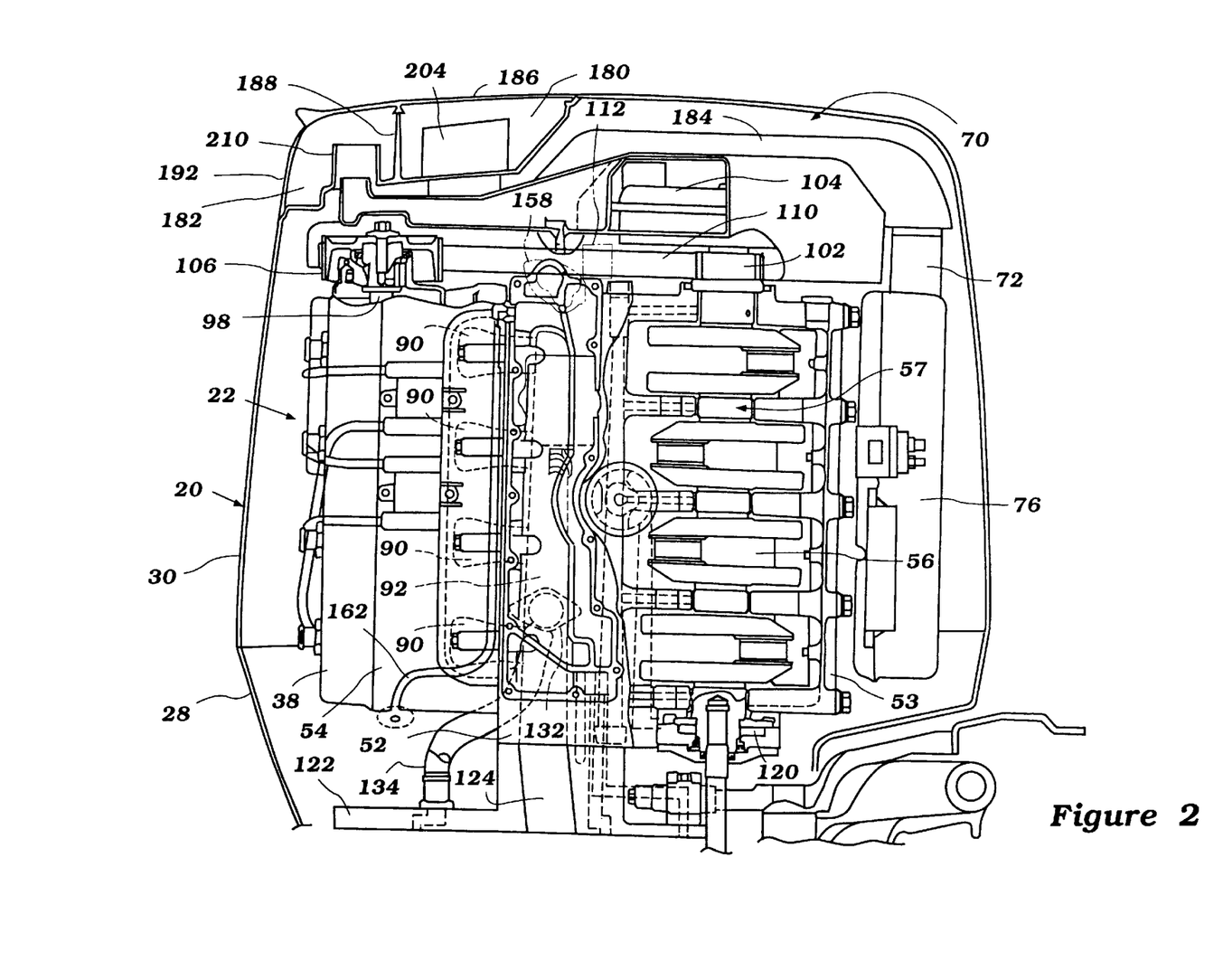
FIG. 2 is a cross-sectional side view of a top portion of the motor illustrated in FIG. 1, with the engine therein also illustrated in cross-section.

As best illustrated in FIGS. 1 and 2, the power head 26 of the outboard motor 20 includes the engine 22 which is positioned within the cowling portion 30. The engine 22 is preferably of the inline, four-cylinder, four-cycle variety, and thus includes a cylinder block 52 which has a cylinder bank closed by a cylinder head assembly 54 in a manner which will be described. As also illustrated in FIGS. 1 and 2, the engine 22 is preferably oriented within the cowling 30 such that its cylinder head 54 is positioned on the block 52 on the side opposite the watercraft's transom.

A crankshaft 56 is rotatably journalled in a crankcase chamber 57 defined by a crankcase cover 53 connected to an end of the cylinder block 52 generally opposite the cylinder head 54. As is typical with outboard motor practice, the engine 22 is mounted in the power head 26 so that the crankshaft 56 rotates about a vertically extending axis. This facilitates coupling to a drive shaft 60 in a manner which will be described.

The drive shaft 60 depends into the lower unit 34, wherein it drives a bevel gear and a conventional forward-neutral-reverse transmission. The transmission is not illustrated herein, because its construction per se forms no part of the invention. Therefore, any known type of transmission may be employed. A control is preferably provided for allowing an operator to remotely control the transmission from the watercraft 24.

The transmission drives a propeller shaft which is journalled within the lower section 40 of the lower unit 34 in a known manner. A hub 62 of a propeller 64 is coupled to the propeller shaft for providing a propulsive force to the watercraft 24 in a manner well known in this art.

Figure 3:
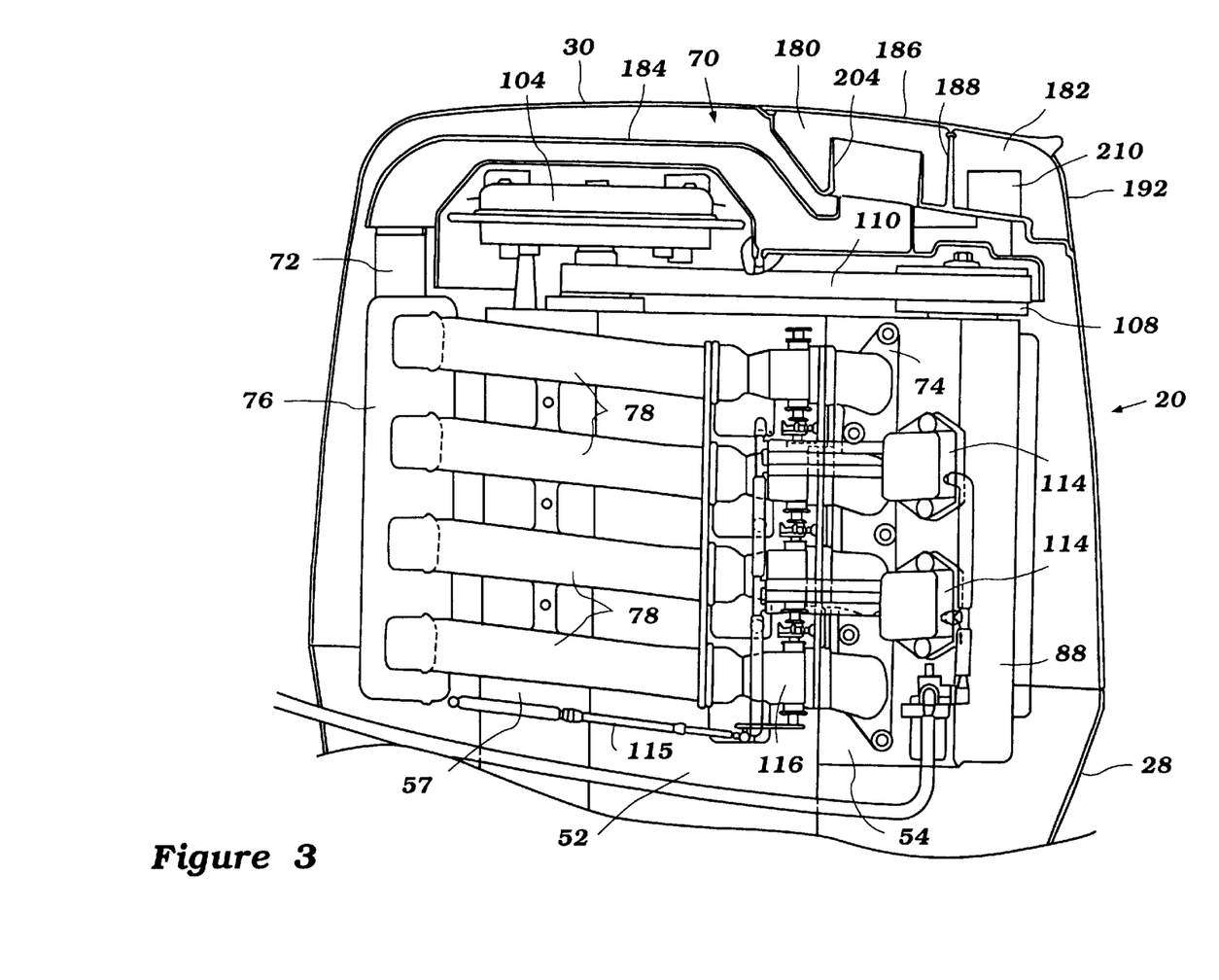
FIG. 3 is a cross-sectional side view of the motor illustrated in FIG. 1, exposing the engine.
Figure 4:
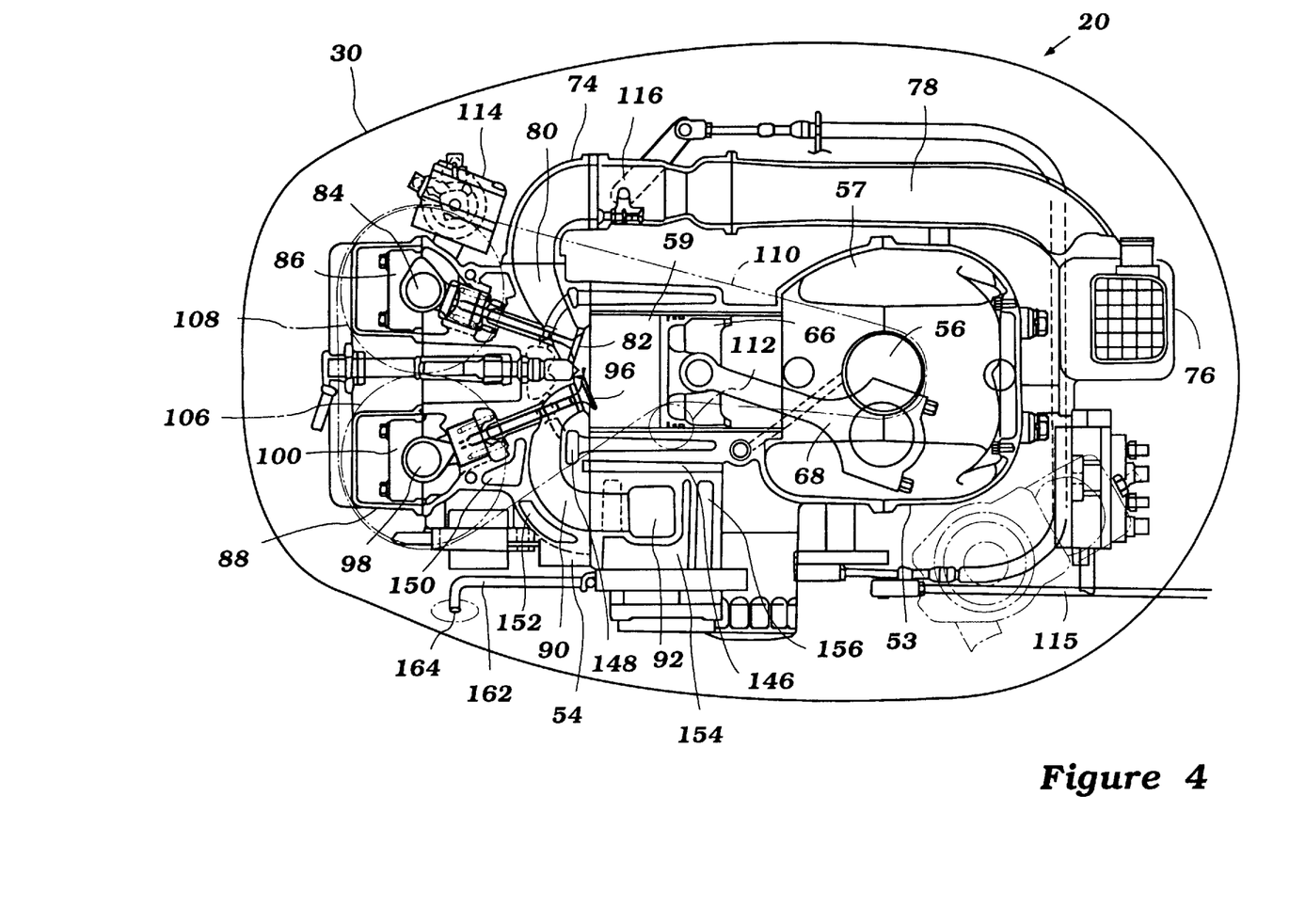
FIG. 4 is a cross-sectional top view of the motor and engine illustrated in FIG. 1.

The construction of the engine 22 and the exhaust manifold cooling arrangement of the present invention will now be described in more detail. As illustrated in FIGS. 2, 3 and 4, the engine 22 has a number of variable volume combustion chambers 59, preferably totaling four in number, arranged in inline fashion. It should be understood that there may be as few as one combustion chamber, or more than four.

Each combustion chamber has a piston 66 mounted therein for reciprocation, the piston connected to the crankshaft 56 via a connecting rod 68. The cylinder head 54 is preferably connected to the cylinder block 52 via a number of bolts, as is known in the art.

As illustrated in FIGS. 2–3, an intake system 70 provides air to each combustion chamber. Described here is the "engine" portion of the intake system 70 including a surge tank 76 and air delivery system. The portion of the intake system 70 which delivers air from the vent portion 32 of the cowling 30 to the surge tank 76 is described in more detail below.

Air which is routed from the vent portion 32 in the manner described below is provided through a passage 72 to a surge tank 76. The surge tank 76 is preferably positioned on the end of the engine 22 facing the watercraft 24. Air is routed from the surge tank 76 by runners 78 to passages extending through an intake manifold 74. Each passage in the manifold 74 leads to a corresponding passage 80 positioned within the cylinder head 54 leading to the combustion chamber. An inlet passage 80 is provided corresponding to each combustion chamber 59.

Means are provided for controlling the passage of air through each inlet passage 80 to its respective combustion chamber 59. Preferably, this means comprises an intake valve 82. As illustrated, all of the intake valves 82 are preferably actuated by an intake camshaft 84. The intake camshaft 84 is mounted for rotation with respect to the head 54 and connected thereto with at least one bracket 86. The camshaft 84 is enclosed by a camshaft cover 88 which is connected to the head 54.

An exhaust system is provided for routing the products of combustion within the combustion chambers 59 to a point external to the engine 22. In particular, an exhaust passage 90 leads from each combustion chamber to a passage 92 in an exhaust manifold portion 94 of the engine 22. The remainder of the exhaust system will be described in more detail below.

Means are also provided for controlling the flow of exhaust from each combustion chamber 59 to its respective exhaust passage 92. Preferably, this means comprises an exhaust valve 96. Like the intake valves 82, the exhaust valves 96 are preferably all actuated by an exhaust camshaft 98. The exhaust camshaft 98 is journalled for rotation with respect to the cylinder head 54 and connected thereto with at least one bracket 100. The exhaust camshaft 98 is enclosed within the camshaft cover 88.

As best illustrated in FIGS. 2 and 3, means are provided for driving the camshafts 84, 98. A timing belt pulley 102 is mounted on a top end of the crankshaft 56 positioned outside of the cylinder block 52, and just below a flywheel 104 also positioned on the crankshaft 56. An exhaust camshaft pulley 106 is mounted on an end of the exhaust camshaft 98 extending from the top end of the engine 22, and an intake camshaft pulley 108 is mounted on an end of the intake camshaft 84 extending from the top end of the engine. A drive belt 110 extends around the timing belt pulley 102 and the exhaust and intake camshaft pulleys 106,108, whereby the camshaft 56 indirectly drives the camshafts 84,98. One or more tensioner pulleys 112 may be provided for maintaining the belt in a taunt condition.

A fuel delivery system is provided for delivering fuel to each combustion chamber 59 for combustion therein. The fuel delivery system preferably includes a fuel tank (not shown) and a number of fuel pumps 114 for pumping fuel from the tank and delivering it to each combustion chamber 59. As known to those skilled in the art, the fuel may be delivered into the incoming air stream, such as with a carburetor or fuel injector, or directly injected into the combustion chamber with a fuel injector.

A throttle 116 is provided for controlling the flow of air into each combustion chamber 59. Preferably, the throttle 116 comprises a moveable plate positioned within the runner 78. The throttle 116 is preferably controlled through a throttle control 115 in the form of a cable extending from a control area of the watercraft 24, whereby the operator of the watercraft may control the throttle remotely therefrom.

A suitable ignition system is provided for igniting an air and fuel mixture within each combustion chamber 59. Such systems are well known to those skilled in the art, and as such forms no portion of the invention herein, such is not described in detail here.

The engine 22 includes a lubricating system for providing lubricant to the various portions of the engine. The lubricating system is not described in detail here, and may be of a variety of types found suitable to those skilled in the art. Generally, the lubricating system includes an oil reservoir 118 positioned below the engine 22. The reservoir 118 is defined by a wall 117 and is in communication with an oil pump 120 via a suction tube 119. The oil pump 120 is preferably positioned on the end of the crankshaft 56 at the bottom of the engine 22. The oil pump 120 pumps lubricant from the reservoir 118 through oil passages throughout the engine 22. The pumped oil drains from the engine 22 back to the reservoir 118 for recirculation by the pump 120.

As illustrated in more detail in FIG. 4, the exhaust manifold is preferably formed integrally with the cylinder block 52. In this arrangement, the exhaust passage 92 is simply a passage extending generally vertically through an extended portion of the cylinder block 52.

Figure 5:
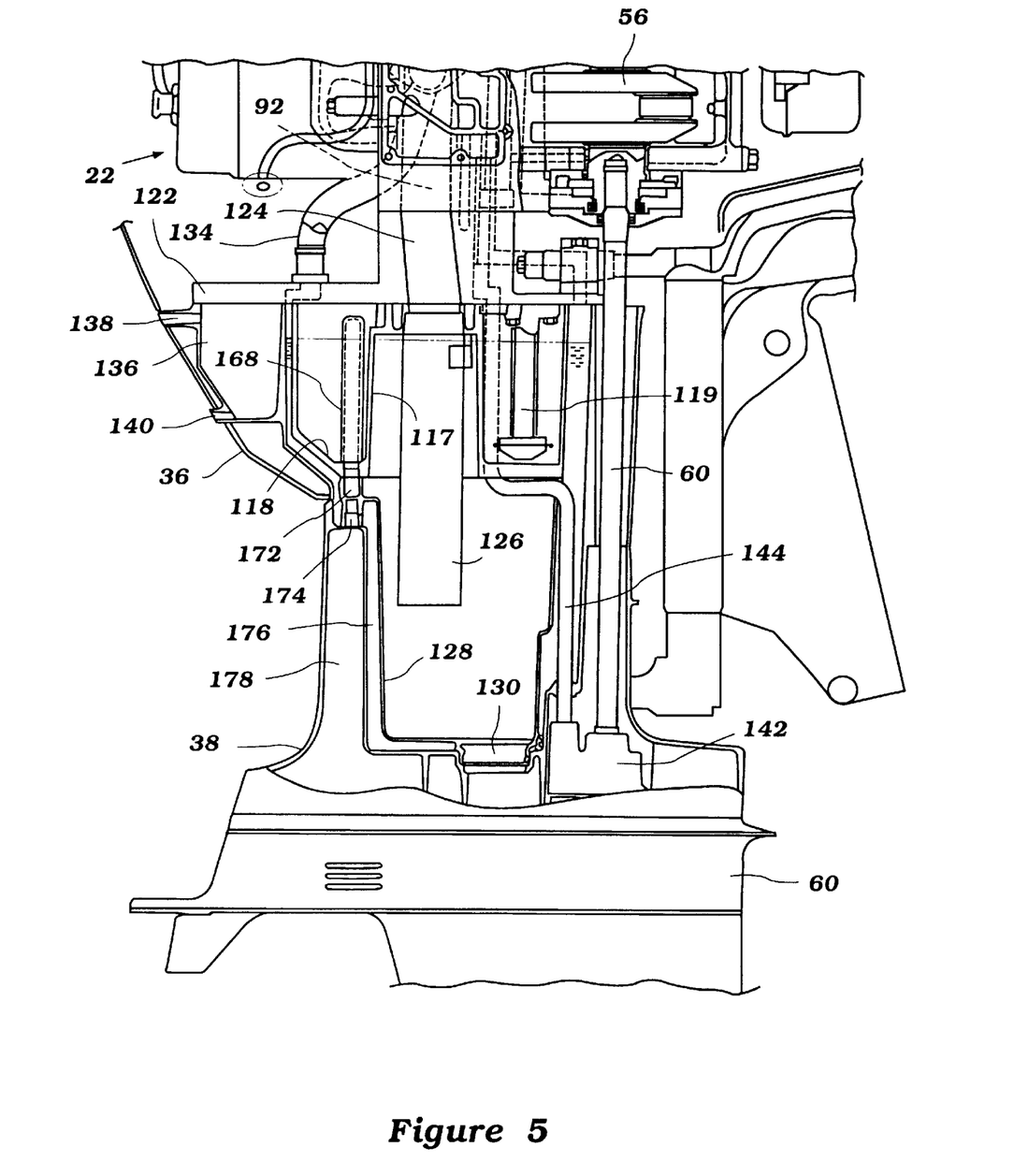
FIG. 5 is a partial cross-sectional side view of a lower portion of the motor illustrated in FIG. 1.
Figure 6:
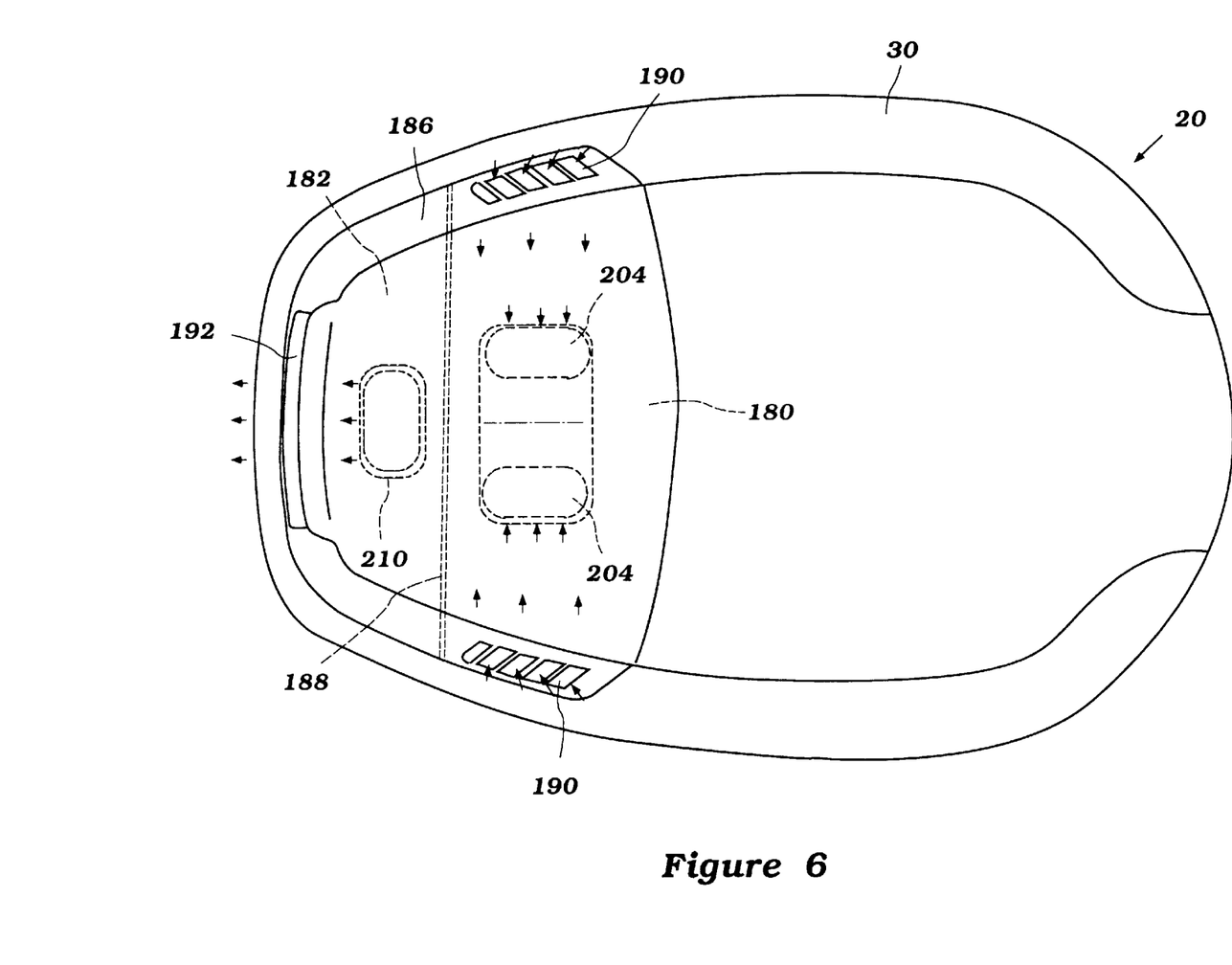
FIG. 6 is a top view of a cowling of the motor illustrated in FIG. 1.

As best illustrated in FIGS. 2 and 5, an exhaust guide 122 is positioned at the bottom end of the engine 22. The exhaust guide 122 has a passage 124 extending therethrough which is aligned with the passage 92 at its top side. An exhaust pipe 126 is connected to the bottom side of the exhaust guide 122 in alignment with the passage 124. The exhaust pipe 126 terminates within a chamber formed within a muffler 128.

The muffler 128 is positioned within the lower unit 38 and between the drive shaft 60 and a cooling liquid return. An exhaust gas outlet 130 is provided in the bottom end of the muffler 128, through which the exhaust gas is routed to a point external of the motor 20, normally through a passage extending through the hub 62 of the propeller 64.

When the exhaust pressure is low, normally when the engine speed is low, the exhaust gas is diverted to an above-water exhaust gas discharge. As illustrated in FIG. 5, this discharge comprises an expansion chamber 136 and first and second exhaust ports 138,140. The exhaust ports 138, 140 extend through the apron 36 from the chamber 136 for exhausting gases therefrom. The lower exhaust port 140 is provided for use in allowing condensed liquids to drain from the chamber 136.

The engine 22 preferably includes a liquid cooling system. Cooling liquid, preferably cooling water from the body of water in which the motor 22 is positioned, is pumped by a pump 142 positioned in the lower unit 34. The pump 142 is preferably driven by the drive shaft 60, and expels the cooling liquid or water upwardly through a cooling liquid pipe 144. This cooling liquid passes into a number of cooling liquid passages throughout the cylinder block 52 and head 54. As best illustrated in FIGS. 2 and 4, these passages include a cooling liquid jacket 146 surrounding the combustion chambers 59 in communication with a similar cooling liquid jacket or passage 148 in the cylinder head 54. Cooling liquid passages 150,152 are further provided in the cylinder head 54 adjacent the exhaust valves 96 and exhaust passages 90. A cooling liquid passage 154 is preferably provided in the manifold portion 94 of the cylinder block 52 on a side of the exhaust passage 92 defined therein opposite the combustion chambers 59. All of the cooling liquid passages lead to a cooling liquid outlet passage 156. Preferably, the cooling liquid flows first through passage 154 and then passages 150,152, before flowing to the passages 146,148 surrounding the combustion chamber 59.

The cooling system preferably includes a thermostat 158 for controlling the flow of cooling liquid through the various cooling liquid passages. In particular, the thermostat 158 is arranged at the top end of the engine 22 for controlling the flow of cooling liquid through the engine 22 to the outlet passage 156. The thermostat 158 prevents the cooling liquid from flowing through the engine 22 when the temperature of the cooling liquid therein is below a pre-determined temperature, thereby allowing the engine to warm up.

As best illustrated in FIGS. 2 and 4, a cooling liquid pressure relief valve 132 is provided. This valve 132 is preferably in communication with the cooling liquid passage 154, and has a relief line 134 extending therefrom. In the instance where the cooling liquid pressure within the cooling passages exceeds a predetermined pressure, the pressure relief valve 132 opens, allowing cooling liquid to flow through the line 134 to a cooling liquid pool or chamber 176.

Cooling liquid which circulates through the engine 22 to the outlet passage 156 (when the thermostat 158 is open) passes downwardly through a cooling liquid discharge pipe 167 into a chamber 176 which extends at least partially around the oil tank 118, muffler 128 and other components. An overflow pipe 168 has its top end positioned in the chamber 176, and extends to first and second passages 172,174 leading to a discharge tank 178, before passing out of the motor 20 back to the body of water from which it was drawn.

In accordance with the present invention, a cooling water tell-tale is provided, allowing the operator of the watercraft 24 to visually determine that coolant is being provided to the engine 22. Referring to FIG. 4, a pilot line 162 extends from one of the cooling liquid passages to a pilot port 164. The port 164 is positioned above the water line, such that a small amount of cooling liquid is expelled therefrom as a visual identifier to the operator that cooling liquid is being provided to the engine.

Figure 9:
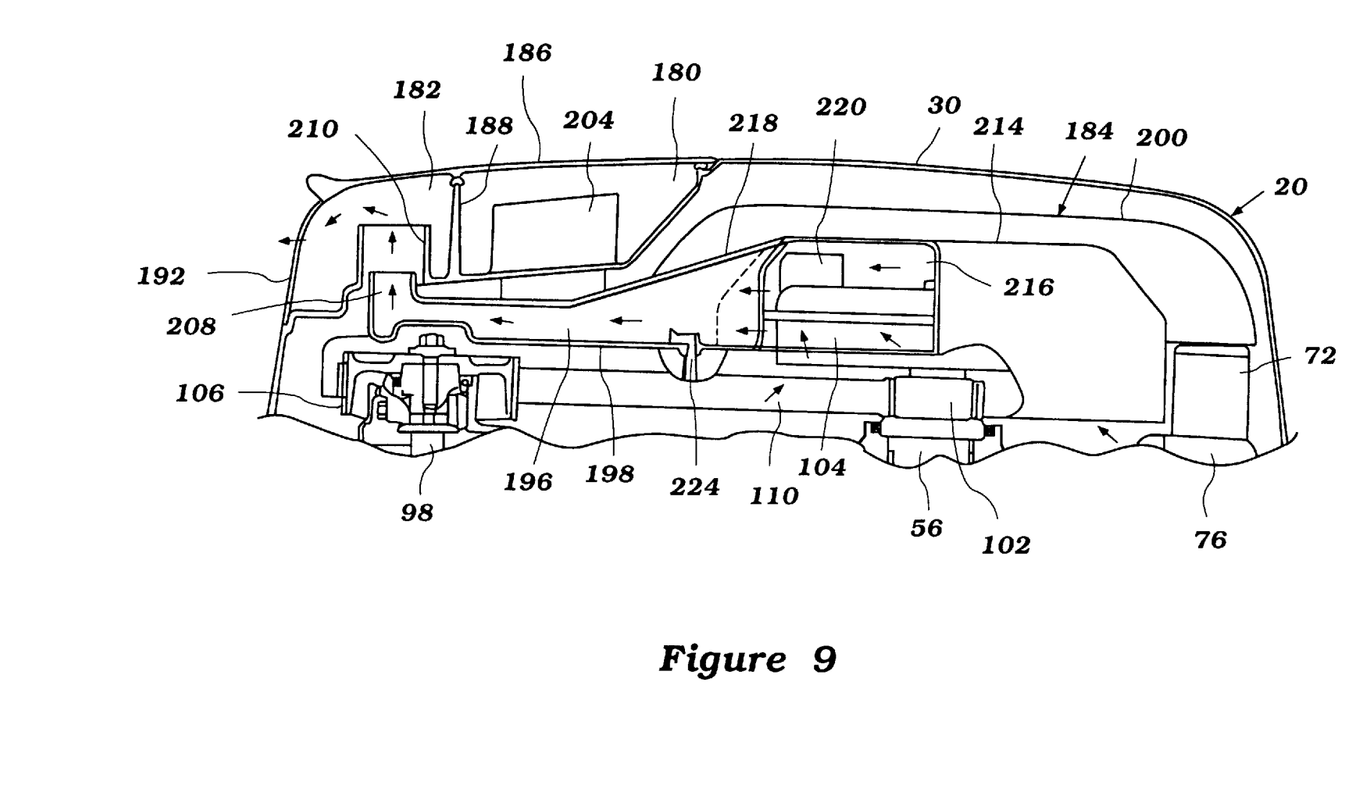
FIG. 9 is a second cross-sectional side view of the cowling illustrated in FIG. 6, and illustrating an air exhaust path through the engine cover.

In accordance with the present invention, the motor 20 has an improved cowling 30 for use in directing fresh air into the engine 22, and for venting heated air within the motor to the outside. As best illustrated in FIGS. 7 and 9, the cowling 30 defines an intake chamber 180, an exhaust chamber 182, and includes an engine cover 184 which serves to route fresh air to the intake passage 172 and surge tank 176, and heated air from inside the cowling 30 to exhaust chamber 182.

Figure 7:
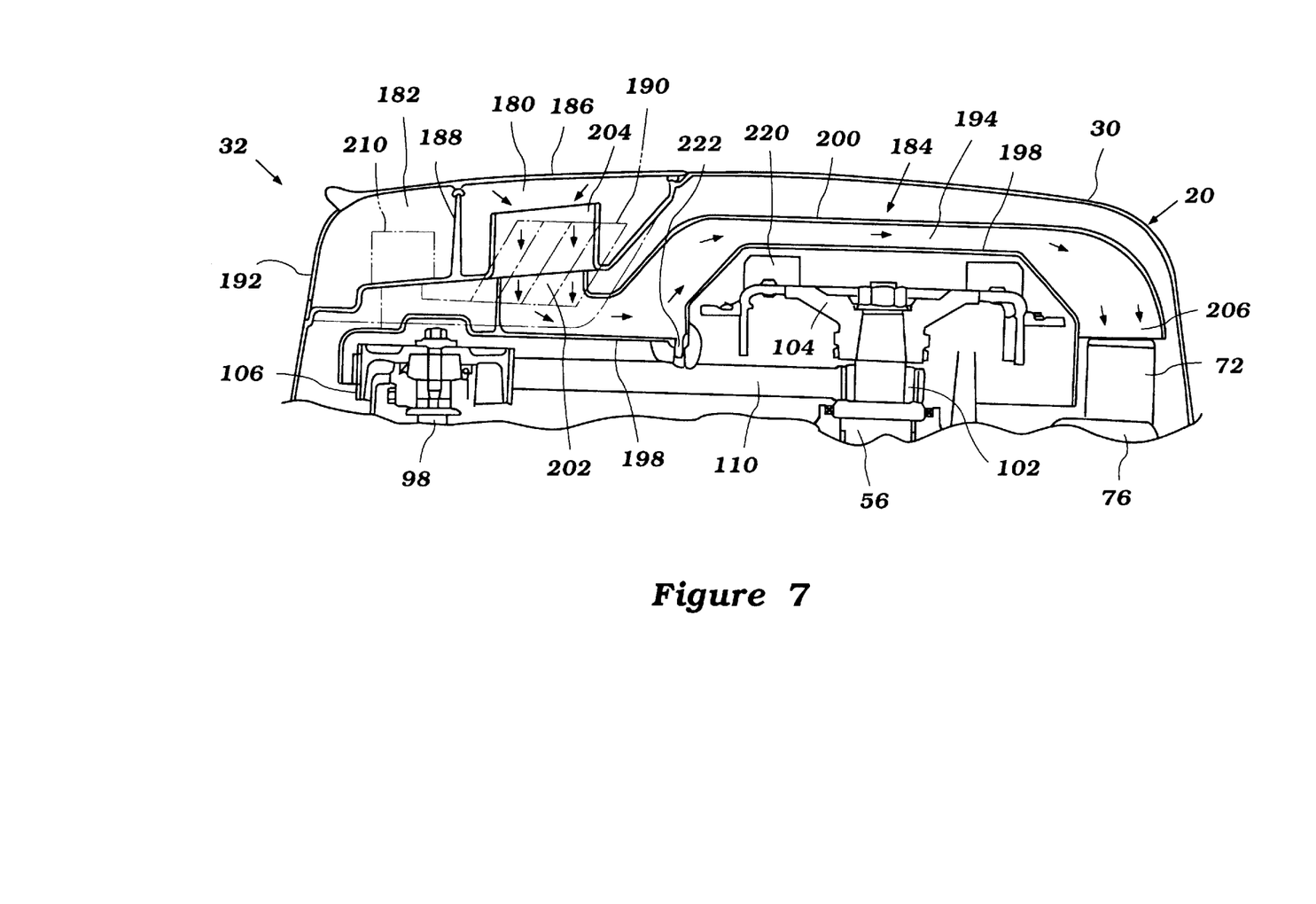
FIG. 7 is a first cross-sectional side view of the cowling illustrated in FIG. 6 along with adjacent engine features, and illustrating an air intake path through an engine cover of cowling.

As best illustrated in FIG. 7, the vent portion 32 of the cowling 30 includes a cover 186. The cover 186 extends over first and second compartments formed as part of the cowling 30 and separated by a divider 188. Preferably, a fresh air or intake vent 190 is provided on each side of the cowling 30 leading into the intake chamber 180. Preferably, a single exhaust vent 192 is provided in the rear of the cowling 30 (i.e., the end of the cowling facing away from the watercraft 24) leading into the exhaust chamber 182.

Figure 8:
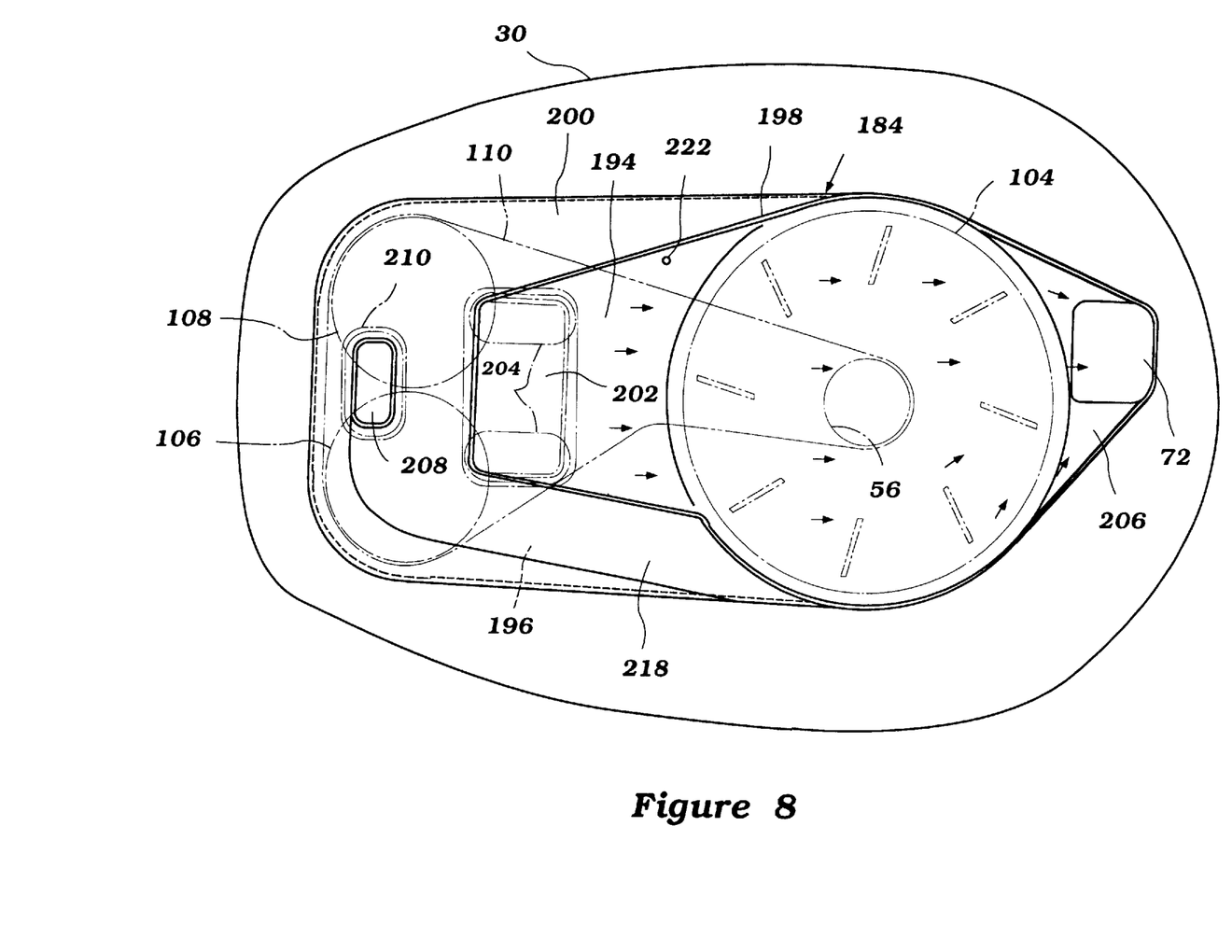
FIG. 8 is a first cross-sectional top view of the view of the cowling illustrating the air intake path.

As best illustrated in FIGS. 7 and 8, the engine cover 184 defines an air intake flow path or passage 194 from the intake chamber 180 to the passage 72, and defines an air exhaust flow path or passage 196 from the area surrounding the engine 22 to the exhaust chamber 182. Preferably, the cover 184 includes a bottom surface 198 and a top surface 200. The bottom surface 198 is adapted to extend over substantially all, and preferably all, of the top end of the engine 22, including the flywheel 104 and the camshaft drive, including the camshaft drive pulleys 106,108.

As illustrated in FIG. 7, the cover 184 defines an inlet 202 extending from the intake flow passage 194 to a pair of upwardly rising ports 204. Air which passes into the vents 190 flows into the intake chamber 180, through one of the two ports 204 and through the inlet 202 into the intake flow passage 194 to an outlet 206. The outlet 206 is in communication with the passage 172 extending to the surge tank 76.

Advantageously, the intake passage 194 is enclosed, isolating the air passing therethrough. In addition, and as illustrated in FIG. 7, the intake passage 194 extends generally across the top end of the engine 22.

As illustrated in FIG. 9, the exhaust path or passage 196 extends from an area of the cover 184 extending about the flywheel 104 to an outlet 208. The outlet 208 is positioned within an upwardly extending port 210 leading into the exhaust chamber 182. Notably, the exhaust passage 196 and intake passage 194 are formed integrally within the same cover 184. As illustrated in FIG. 9, the bottom surface 198 defines a chamber 214 in which the flywheel 104 rotates. This chamber 214 has an opening or inlet leading to the area surrounding the engine therebelow. The chamber 214 has an outlet 216 leading to the passage 196. Preferably, the cover 184 includes a wall 218 which serves to divide the two passages 194,196.

Figure 10:
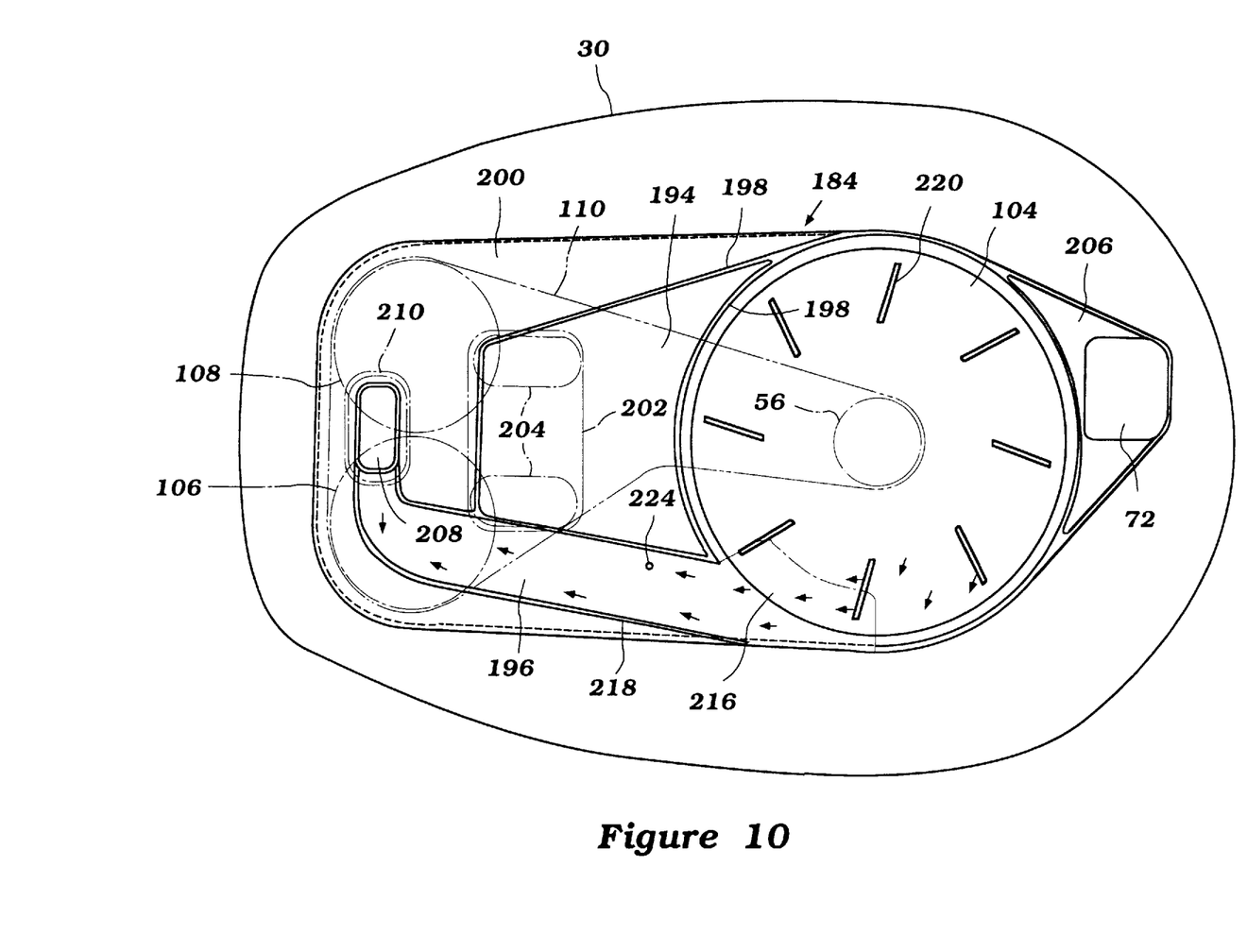
FIG. 10 is a second cross-sectional top view of the cowling illustrating the air exhaust path.

In order to draw heated air from around the engine 22 out of the cowling 30, the flywheel 104 preferably has a number of vanes 220 positioned on a top surface thereof. As best illustrated in FIGS. 9 and 10, the vanes 220 are so oriented as to draw heated air into the chamber 214 and then expel it through the outlet 216 into the exhaust passage 196. The heated gas flows through the passage 196 into the chamber 182, and is expelled through the vent 192 in the cowling 30.

Preferably, a water drain 222 is provided in the intake passage 194 for draining water which enters the intake system. A similar drain 224 is provided in the exhaust passage 196.

The cowling 30 of the present invention has numerous advantages and overcomes the problems associated with prior art outboard motor arrangements. In accordance with the present invention, an intake system is provided which not only serves to prevent the entry of water into the engine but also ensures that the engine receives only fresh air. In particular, the incoming air is routed directly from air vents (positioned in front of the exhaust vent in the direction of watercraft travel) through a closed passage to the engine's intake system. At the same time, heated air in the engine is routed from the engine compartment within the cowling to an exhaust vent. In this manner, the engine is cooled.

Water is prevented from entering the system through the use of inlet and exhaust openings in the upwardly extending parts. Water which does enter the passages 194,196 is drained therefrom by the drains 222, 224.

Figure 11A:
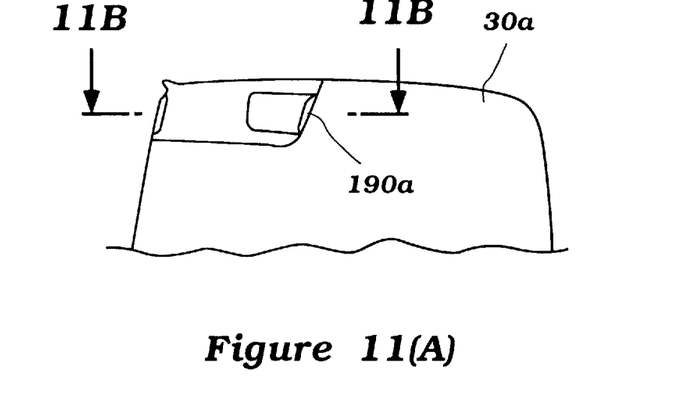
FIG. 11(a) is a side view of a cowling in accordance with a second embodiment of the present invention.
Figure 11B:
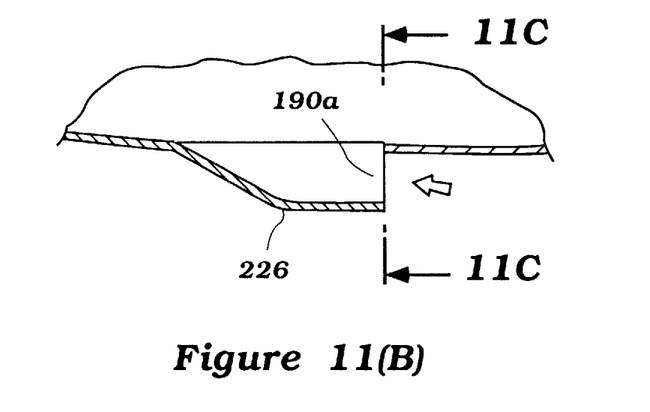
FIG. 11(b) is a cross-sectional view of the cowling illustrated in FIG. 11(a) taken along line b—b therein.
Figure 11C:
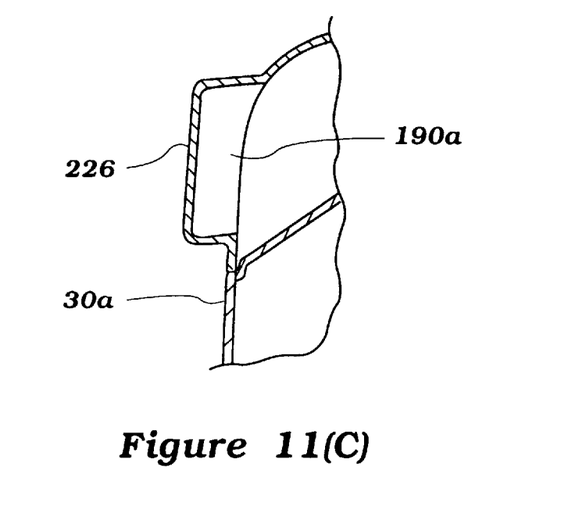
FIG. 11(c) is a cross-sectional view of the cowling illustrated in FIG. 11(b) and taken along line c—c therein.

FIGS. 11(a)–11(c) illustrate an alternate embodiment cowling 30a in accordance with the present invention. As illustrated therein, instead of a vent simply consisting of a number of aperatures in the cowling, as in the above-described embodiment, the vent 190a may comprise an air grabbing scoop 190a. The scoop 190a is formed by an outwardly extending section 226 of the cowling 30a. This arrangement takes advantage of the fact that during many running conditions, the motor 20 is moving relative to the surrounding air. Thus, when the watercraft 24 is being propelled forward by the motor 20, the surrounding air is forced into the scoop 109a (as indicated by the arrow in FIG. 11(b)), and thereon into the chamber 180. In this manner, a "supercharging" effect is created, having the tendency of increasing the performance of the engine 22.

Figure 12A:
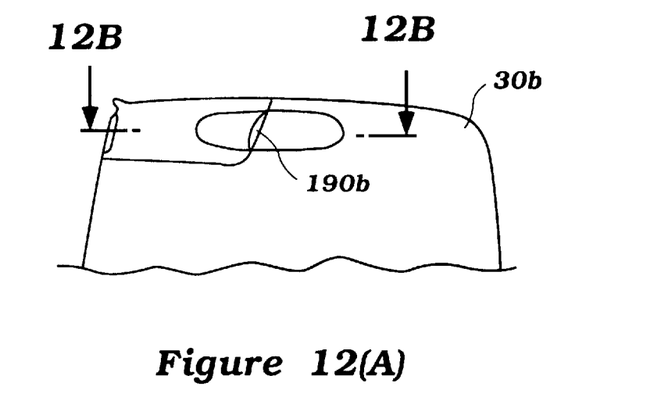
FIG. 12(a) is a side view of a cowling in accordance with a third embodiment of the present invention.
Figure 12B:
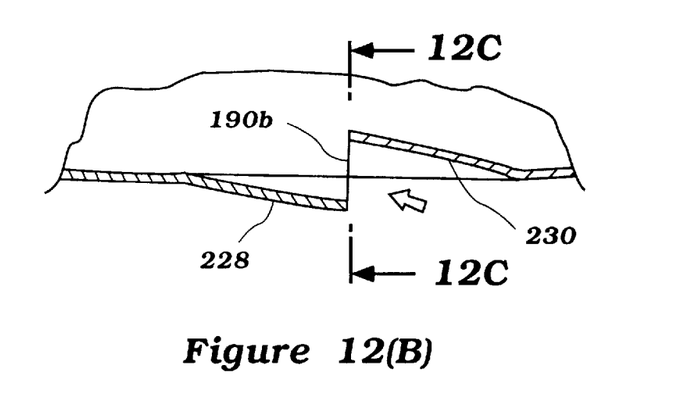
FIG. 12(b) is a cross-sectional view of the cowling illustrated in FIG. 12(a) taken along line b—b therein.
Figure 12C:
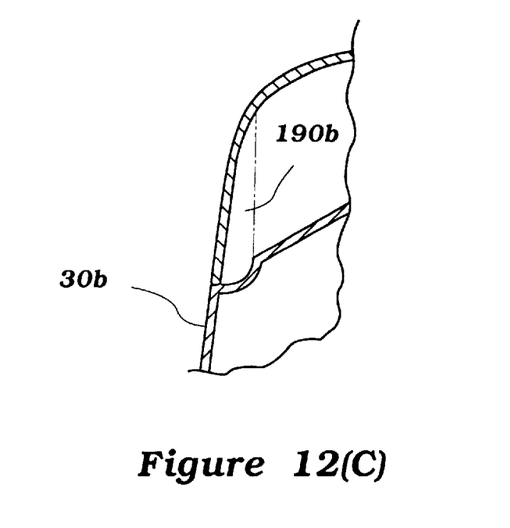
FIG. 12(c) is a cross-sectional view of the cowling illustrated in FIG. 12(b) taken along line c—c therein.

FIGS. 12(a)–12(c) illustrate a second alternate embodiment cowling 30b in accordance with the present invention. In this embodiment, an air scoop 190b is formed by the combination of an outwardly extending section 228 of the cowling positioned adjacent a recessed section 230 of the cowling 30b. This arrangement functions generally like the arrangement described above.

Of course, the foregoing description is that of preferred embodiments of the invention, and various changes and modifications may be made without departing from the spirit and scope of the invention, as defined by the appended claims.

What is claimed is:

1. An outboard motor having a cowling with an internal combustion engine positioned therein, said engine having a front end, a top end and a bottom end and a generally vertically oriented crankshaft, said crankshaft extending positioned below said engine in driving relation with a water propulsion device of said motor, a cover positioned between said cowling and said top end of said engine, said cover defining an isolated air intake flow path extending from an intake opening in said cowling along said top end of said engine to the front of said engine and into an upper end of a surge tank at the front end of said engine leading to an air intake of said engine, and said cover defining an air exhaust path extending in communication with a space surrounding said engine to an exhaust vent in said cowling.

2. The outboard motor in accordance with claim 1, wherein said cover includes a first surface generally extending over said top end of said engine, said first surface having at least one opening therein in communication with said exhaust path, whereby heated air surrounding said engine may pass through said opening to said exhaust path and therealong to said exhaust vent.

3. The outboard motor in accordance with claim 1, wherein said air intake opening comprises at least one intake vent positioned in a side of said cowling.

4. The outboard motor in accordance with claim 3, wherein said at least one intake vent is in the form of an air-grabbing scoop.

5. The outboard motor in accordance with claim 3, wherein said cowling has a front end and a rear end, said front end generally facing a watercraft when said outboard motor is connected thereto, and wherein said exhaust vent is positioned nearer said rear end than said at least one intake vent.

6. The outboard motor, in accordance with claim 1, wherein a flywheel is positioned at said top end of said engine and driven by said crankshaft, said flywheel positioned within a chamber defined by said cover, said chamber having an inlet in communication with said space surrounding said engine and having an outlet in communication with said exhaust path.

7. The outboard motor in accordance with claim 6, wherein at least one vane is positioned on said flywheel for drawing air through said inlet and expelling it out said outlet.

8. The outboard motor, in accordance with claim 1, wherein said engine has a rear end, said air intake opening being generally positioned in a portion of said cowling corresponding to said rear end of said engine.

9. The outboard motor, in accordance with claim 1, wherein said engine has a camshaft drive system at said top end thereof, and said cover extends over said camshaft drive system.

10. An outboard motor comprising a cowling defining an engine compartment, a water propulsion device, and an internal combustion engine, said engine positioned within said engine compartment and having a top end, a front end, and a bottom end and a vertically extending crankshaft in driving relation with said water propulsion device, said engine having an air intake, said motor further including means for drawing fresh air through said cowling and isolating said air and routing said air along the top of said engine to the front end of said engine and into an upper end of surge tank located at said front end of said engine and leading to said engine intake, and for routing heated air within said engine compartment and expelling it through said cowling, said means comprising a cover having a lower surface substantially covering said top end of said engine and with said cover defining a passage leading from at least one intake vent in said cowling to said surge tank.

11. The outboard motor, in accordance with claim 10, wherein said cover defines a chamber in which a flywheel of said engine rotates, said chamber having an inlet in communication with the engine compartment.

12. The outboard motor in accordance with claim 10, wherein said chamber has an outlet leading to an exhaust passage, said passage leading to an exhaust vent in said cowling.

13. The outboard motor in accordance with claim 10, wherein said means includes an intake chamber and at least one vent in said cowling leading to said intake chamber, and an exhaust chamber and at least one vent in said cowling leading to said exhaust chamber.

14. The outboard motor in accordance with claim 10, wherein said means includes means for draining water therefrom.

15. The outboard motor in accordance with claim 10, wherein said means includes an air-grabbing scoop through which air is drawn into said cowling.

16. An outboard motor having a cowling defining an engine compartment with an internal combustion engine positioned therein, said engine having a front end, a top end and a bottom end and a generally vertically oriented crankshaft, said crankshaft extending below said engine in driving relation with a water propulsion device of said motor, said cowling defining an air intake flow path from a first point external to said motor along said top end of said engine to, said front end of said engine and into an upper end of a surge tank located at the front end of said engine leading to an air intake of said engine isolated from air within said engine compartment, and an air exhaust path extending in communication with said engine compartment to a second point external to said engine.

* * * * *

UNITED STATES PATENT AND TRADEMARK OFFICE
CERTIFICATE OF CORRECTION

PATENT NO. : 5,873,755

DATED : February 23, 1999

INVENTOR(S): Masanori Takahashi et al.

It is certified that error appears in the above-identified patent and that said Letters Patent is hereby corrected as shown below:

In Claim 1, at column 8, line 42, "extending positioned below" should be --extending below--.

In Claim 8, at column 9, line 16, "engine has a rear end" should be --engine has a front end and a rear end--.

Signed and Sealed this

Twelfth Day of September, 2000

*Attest:*

Q. TODD DICKINSON

*Attesting Officer*            *Director of Patents and Trademarks*